United States Patent
Xiong et al.

(10) Patent No.: US 9,693,404 B1
(45) Date of Patent: Jun. 27, 2017

(54) NEGATIVE CURRENT SENSING METHOD FOR MULTI-CHANNEL LED DRIVER

(71) Applicant: Universal Lighting Technologies, Inc., Madison, AL (US)

(72) Inventors: Wei Xiong, Madison, AL (US); Mark Arias, Madison, AL (US); John Helms, Madison, AL (US); Haiqing Yang, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/266,211

(22) Filed: Sep. 15, 2016

Related U.S. Application Data

(60) Provisional application No. 62/238,410, filed on Oct. 7, 2015.

(51) Int. Cl.
*H05B 33/08* (2006.01)
*H02M 1/088* (2006.01)
*H02M 1/00* (2006.01)

(52) U.S. Cl.
CPC ........ *H05B 33/0815* (2013.01); *H02M 1/088* (2013.01); *H05B 33/0845* (2013.01); *H02M 2001/0009* (2013.01)

(58) Field of Classification Search
None
See application file for complete search history.

(56) References Cited

U.S. PATENT DOCUMENTS

| | | | | |
|---|---|---|---|---|
| 8,169,185 B2 * | 5/2012 | Partovi | ........ | H01F 5/003 320/108 |
| 8,492,988 B2 * | 7/2013 | Nuhfer | ........ | H05B 33/0815 315/209 R |
| 8,502,470 B2 * | 8/2013 | Barnett | ........ | H02J 1/14 307/38 |
| 9,000,673 B2 * | 4/2015 | Feng | ........ | H05B 33/0839 315/186 |
| 2002/0140403 A1 * | 10/2002 | Reddy | ........ | H02J 9/062 320/162 |
| 2003/0095421 A1 * | 5/2003 | Kadatskyy | ........ | H02M 1/34 363/65 |
| 2008/0018261 A1 * | 1/2008 | Kastner | ........ | F21V 23/00 315/192 |

(Continued)

*Primary Examiner* — Crystal L Hammond
(74) *Attorney, Agent, or Firm* — Patterson Intellectual Property Law, P.C.; Mark J. Patterson; Gary L. Montle

(57) ABSTRACT

A multi-channel LED driver is provided with a negative current sensing method for inherent output short circuit protection, as well as protection from output misconnection. A plurality of power converters are configured to drive respective LED arrays, each power converter respectively comprising a first stage configured to provide current through a primary winding of an isolation transformer. A second stage has a capacitor coupled in parallel with a secondary winding of the isolation transformer, a current sensing resistor coupled between the secondary winding and a circuit ground for the second stage. A filtering circuit is coupled on a first end to a node between the secondary winding and the current sensing resistor, and on a second end to the circuit ground. A feedback circuit is coupled between the first stage and the filtering circuit, and configured to deliver a control signal corresponding to current through the secondary winding.

20 Claims, 3 Drawing Sheets

(56) References Cited

U.S. PATENT DOCUMENTS

| | | | |
|---|---|---|---|
| 2011/0085358 A1* | 4/2011 | Matthews | H02M 3/33507 363/21.13 |
| 2011/0291574 A1* | 12/2011 | Ji | H05B 33/0815 315/187 |
| 2012/0043818 A1* | 2/2012 | Stratakos | H02J 3/383 307/77 |
| 2013/0285565 A1* | 10/2013 | Feng | H05B 33/0839 315/186 |
| 2014/0312789 A1* | 10/2014 | Feng | H02M 3/33507 315/186 |
| 2016/0373076 A1* | 12/2016 | Buono | H03F 3/2173 |

* cited by examiner

NEGATIVE CURRENT SENSING METHOD FOR MULTI-CHANNEL LED DRIVER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/238,410, dated Oct. 7, 2015, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to isolated multi-channel LED drivers. More particularly, the present invention relates to an LED driver configuration providing protection against output short circuits, and/or against abnormal output connections.

Light emitting diode (LED) lighting is growing in popularity due to decreasing costs and long life compared to incandescent lighting and fluorescent lighting. LED lighting can also be dimmed without impairing the useful life of the LED light source.

A particular CLASS-2 LED driver for multi-channel LED configurations is defined in Underwriters Laboratories specifications. Such a configuration is desirable because of its smaller size, low fixture design cost and easier and better thermal management on the fixture design side. However, the U.L. specification requires the multi-channel LED driver to be isolated and have a maximum output voltage of less than 60 volts DC at any given time.

The multi-channel LED driver must also be able to pass a short circuit test, or in other words be sufficiently protected against short circuit conditions. In addition, the multi-channel driver must be configured to survive output abnormal connections (i.e., in parallel or series connection). If a light source such as an LED module containing an array of lighting elements is coupled on a first end to a terminal in a first channel, and on a second end to a terminal in a second channel, the driver must be designed to survive such a condition.

BRIEF SUMMARY OF THE INVENTION

A multi-channel LED driver as disclosed herein is designed to reduce the cost and size of conventional topologies, while addressing the aforementioned problems and requirements.

Various embodiments of an LED driver as disclosed herein will provide inherent protection against output short circuit conditions.

In addition, various embodiments of an LED driver as disclosed herein will work correctly regardless of how an LED load is connected between terminals in the various power converter channels.

Further, only one dimming reference signal is required for a multiple channel output.

In one particular embodiment, a multi-channel power supply as disclosed herein includes first and second power converters configured to drive respective first and second lighting sources. Each of the first and second power converters respectively has a primary stage and a respectively isolated secondary stage. The secondary stage includes an energy storage device coupled in parallel with a secondary winding for the isolation transformer, a current sensing resistor coupled on a first end to the secondary winding and on a second end to a circuit ground for the second stage, and a filtering circuit coupled on a first end to a node between the secondary winding and the current sensing resistor, and on a second end to the circuit ground. A feedback circuit is coupled between the first stage and the filtering circuit and is configured to deliver a control signal to the first stage corresponding to a current through the secondary winding.

An exemplary aspect of the power supply as described above is wherein the circuit ground for the second stage is coupled to a node between the second end of the current sensing resistor and the energy storage device.

In another aspect of the invention, the feedback circuit includes an amplifier circuit configured to receive a first input from the filtering circuit representative of the current through the secondary winding and to receive a second input from a dimming controller, and is configured to deliver a control signal to the first stage corresponding to a difference between the first and second inputs.

In another aspect of the invention, the amplifier circuit receives the first input as a negative signal, and includes an operational amplifier further configured to reverse the signal polarity of the first input.

In another aspect, the feedback circuit may further include an isolation circuit coupled between the amplifier circuit and the first stage.

In still another aspect, the power supply may include the dimming controller, which is configured to receive a dimming input signal from an external dimming device and to generate reference signals as the second input to the respective feedback circuits for the first and second power converters.

In still another aspect, the filtering circuit may include a resistor and a capacitor coupled in series, with the first input to the amplifier circuit provided from a node between the resistor and the capacitor of the filtering circuit.

In yet another aspect, various secondary stages may include a rectifier diode to convert AC power from the secondary winding to DC power for input to an LED array as the light source.

In yet another aspect, the secondary stage of the first power converter and the secondary stage of the second power converter are each coupled to the same circuit ground.

In another embodiment as disclosed herein, a method of operating a multi-channel LED driver as disclosed herein may include a first step of coupling a first end of an LED light source to a first terminal corresponding to the first end of the capacitor in the first power converter and a second end of the LED source to a second terminal corresponding to the second end of the capacitor in the second power converter. The method further includes filtering out an AC ripple across the respective current sensing resistors for the first and second power converters, wherein an average current through the current sensing resistors corresponds to a DC current through the LED light source, and controlling each of the first and second power converters to provide a current through the respective secondary windings based on the sensed average current.

DETAILED DESCRIPTION OF THE INVENTION

Figure 1:
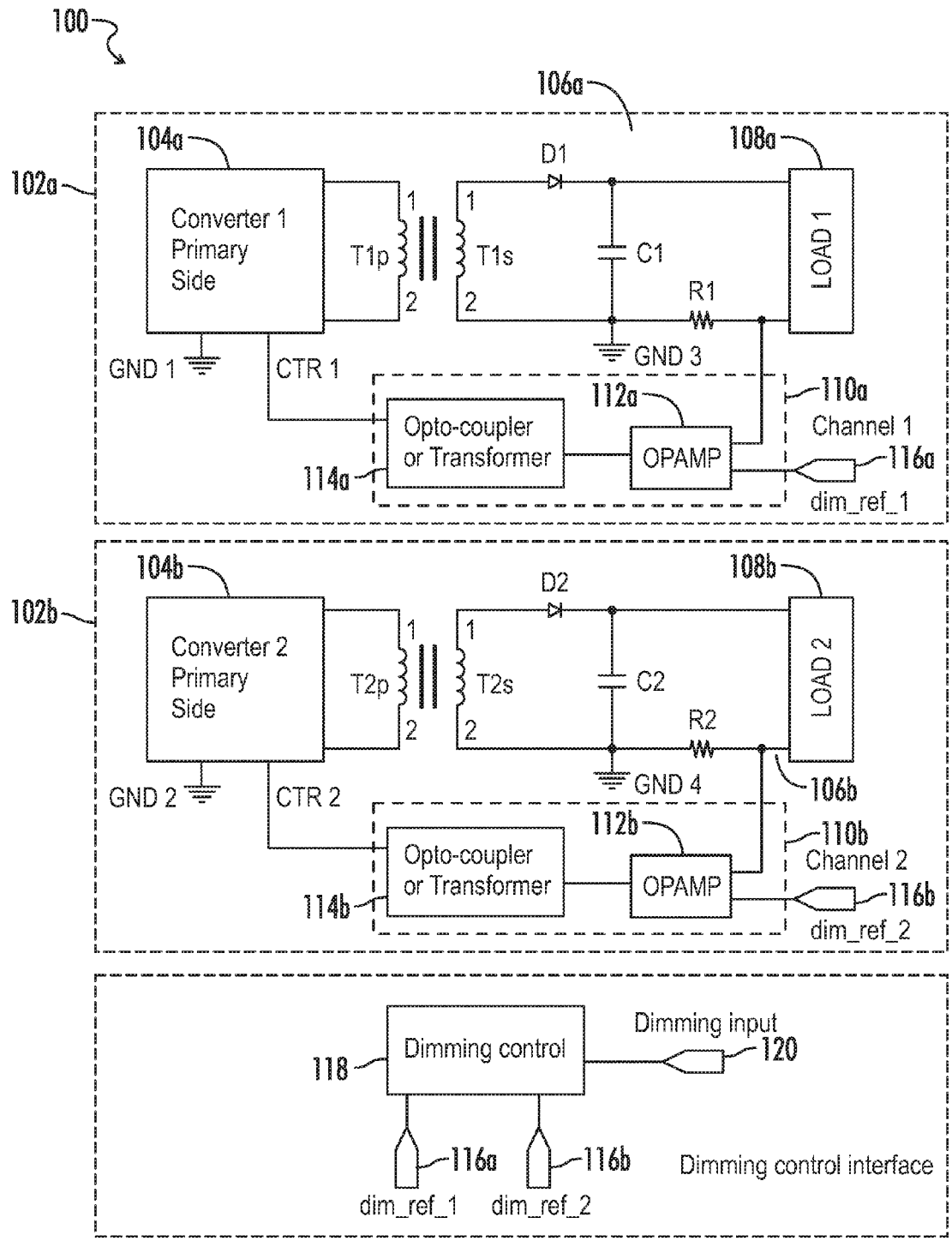
FIG. 1 is a circuit block diagram representing an embodiment of a multi-channel LED driver configuration.
Figure 2:
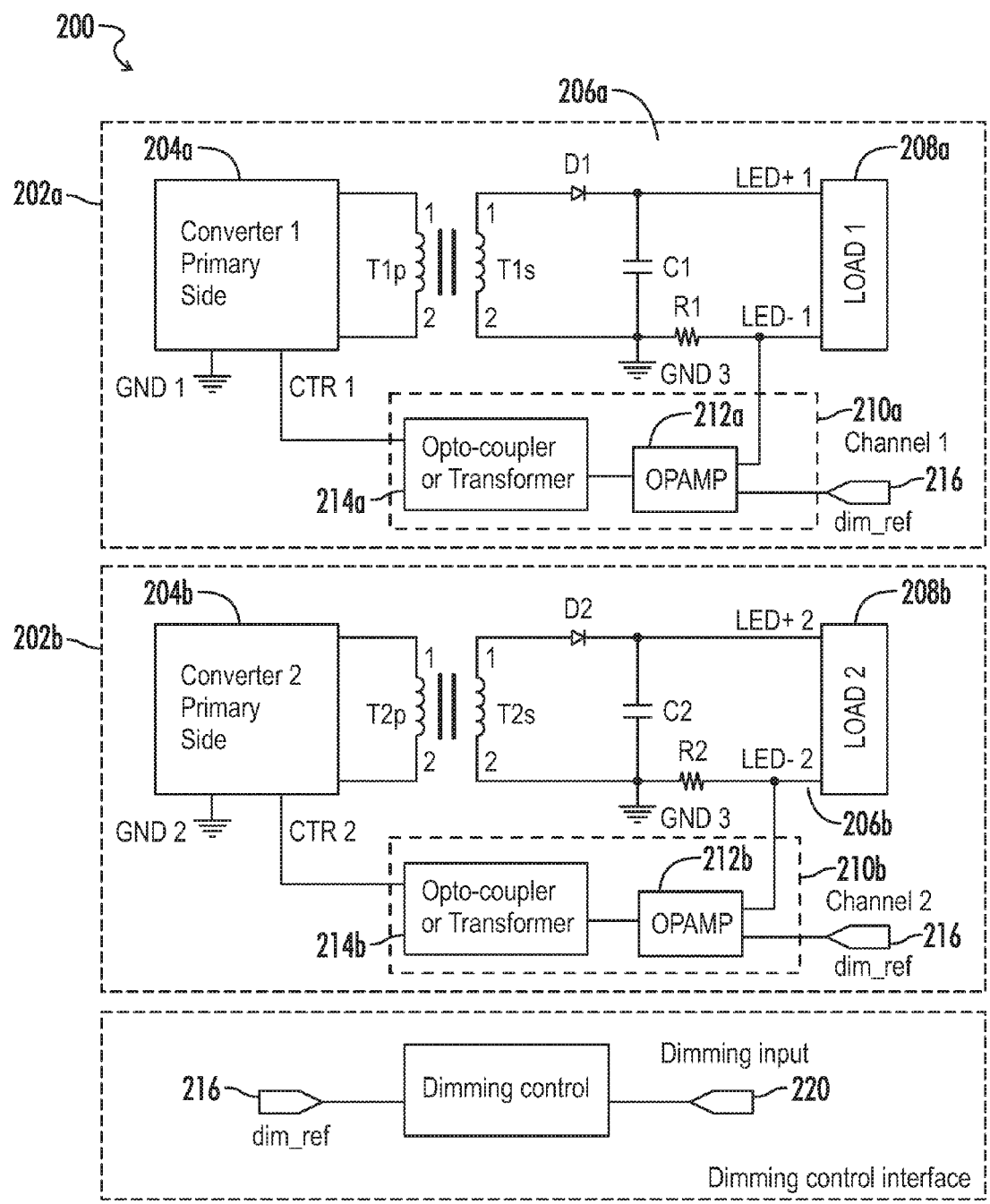
FIG. 2 is a circuit block diagram representing another embodiment of a multi-channel LED driver configuration.
Figure 3:
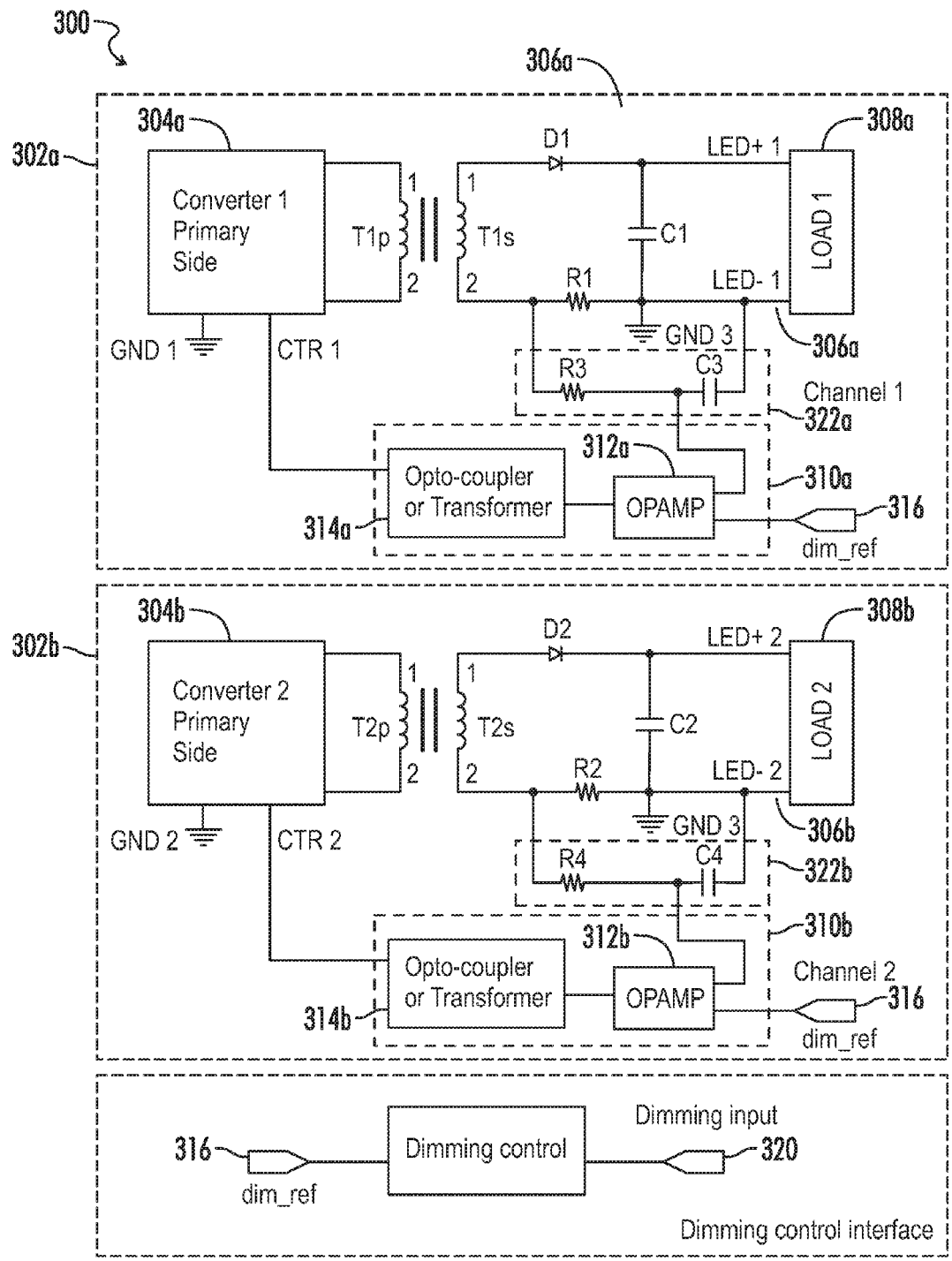
FIG. 3 is a circuit block diagram representing another embodiment of a multi-channel LED driver configuration.

Referring generally to FIGS. 1-3, various exemplary embodiments of the present invention may now be described in detail. Where the various figures may describe embodiments sharing various common elements and features with other embodiments, similar elements and features are given the same reference numerals and redundant description thereof may be omitted below.

In various embodiments as described below, a multi-channel power converter may be provided for a lighting fixture (not shown) having a plurality of lighting sources disposed therein. In one example, each channel is configured with output terminals for association with an LED module having a circuit board and an array of light emitting diodes (LEDs) disposed thereon.

With initial reference to a multi-channel power converter 100 as shown in FIG. 1, one straightforward solution to the aforementioned problems is to provide multiple totally independent class II output channels. In the example shown, as well as in subsequent examples, a dual-channel converter is provided but additional channels are considered as within the scope of a multi-channel converter of the present invention.

As shown in FIG. 1, each channel (using a first channel 102a as exemplary) has a converter primary side 104a and a secondary side 106a. An output transformer T1 provides isolation between respective primary and secondary sides T1p, T1s. A current sensing signal is measured across current sense resistor R1 and fed back to the primary side 104a via feedback circuit 110a. The feedback circuit 110a as shown includes an amplifier circuit (e.g., an operational amplifier 112a) which receives the current sensing signal and a dimming reference signal 116a to realize PI control.

The dimming reference signal 116a may in various embodiments for example be provided from a dimming control circuit 118 which receives a dimming input signal 120 from an external dimming interface (not shown), and provides reference signals to each of the channels based on the remote input.

As the circuit ground GND3 for the secondary side differs from the circuit ground (e.g., GND1) for the primary side, an isolation device 114a (e.g., an opto-coupler or transformer) is further used as part of the feedback circuit 110a to relay this control signal (CTR1) from the secondary side to the primary side for load current regulation. A controller, an array of switching elements, and associated switch driving circuitry (not shown) may be provided within the primary side 104a. The controller may be configured to receive the control signal CTR1 and regulate a switching frequency of the switching elements and thereby an output power to the secondary side 106a. A rectifier diode D1 is coupled on one end to the secondary winding T1s to convert AC current to DC current. A filter capacitor C1 is coupled on a first end to the rectifier diode D1 and on a second end to secondary circuit ground GND3. Output power is provided to a lighting source or load 108a coupled across the filter capacitor C1.

However, the cost of dimming control for such an embodiment of the power converter 100 is relatively large, as the dimming control 118 has to have multiple isolated dimming reference outputs 116a, 116b, simply because all channels 102a, 102b are isolated.

In addition, such an embodiment of the power converter 100 may find it difficult to survive output short circuit conditions, as the current sensing resistor R1 is in the short circuit discharge path for the filter capacitor C1.

Accordingly, with further reference to a circuit topology as disclosed in FIG. 2, another embodiment of a power converter 200 simplifies the circuit by sharing a common ground GND3 on the secondary sides 206a, 206b for each respective channel 202a, 202b so that only one dimming reference signal 216 is needed for LED output control in each of multiple channels. In other words, all of the control signals CTR1, CTR2 will refer to this common ground GND3, and as a result only one dimming reference signal 216 is needed for effective dimming control of each respective channel.

However, there are potential drawbacks to this topology as well. When the output is shorted (e.g., across terminals LED+1, LED−1), the current sensing resistor R1 is still in the discharge path for the filter capacitor C1, which makes it very difficult for the driver 200 to pass the Underwriters Laboratories (UL) output short test.

Another drawback is apparent in the instance where the output is improperly connected. For example, a user might connect only one LED load between respective terminals LED+1 and LED−2 from disparate channels, wherein the first converter channel 206a will lose its current control signal, and as a further result appropriate regulation of the output current will be lost. The reason for this is that LED current will not pass through the current sensing resistor R1 because the first terminal LED−1 is not connected to the LED load 208a. Instead, the LED current will return to the secondary winding Ts1 by going through the current sensing resistor R2 for the second channel 206b because as previously discussed the ground GND3 is shared for both channels.

These drawbacks can be fatal in that they will foreseeably prevent the driver from passing the UL class II test for abnormal conditions.

Referring next to FIG. 3, an embodiment of an LED driver 300 as further disclosed below will provide a negative current sensing method and effectively address each of the aforementioned problems.

As shown in FIG. 3, the driver 300 still includes a shared common ground GND3, which preserves cost effective and relatively simple dimming control. Again, only one dimming reference signal 316 is needed for each channel 302a, 302b of the multiple channel output driver 300.

However, instead of directly sensing the LED current via the current sensing resistor (e.g., R1) the disclosed circuit now senses the total current through the secondary winding T1s. The current sensing resistor R1 is positioned between the output capacitor C1 and the secondary winding T1s, and is therefore no longer in the discharge path for the output capacitor C1 during an output short circuit condition. As such, no large discharge current will pass through the fragile current sensing resistor R1.

The average current (or DC current) going through the current sensing resistor R1 is approximately equal to the LED output DC current, simply because there is no DC current that can go through the output filter capacitor C1. A filtering circuit 322a is coupled across the current sensing resistor R1, or in other words on a first end to the secondary winding T1s and on a second end to circuit ground GND3. In an embodiment as show, the filtering circuit 322a includes a series circuit of a resistor R3 and a capacitor C3, which filters out the AC ripple across the current sensing resistor R1. Because the common ground GND3 is on the other side of the current return path, the current sensing signal is a negative signal. The amplifier circuit 312a, such as for example an op-amp, can be used to easily reverse the signal polarity.

The driver 300 disclosed in FIG. 3 may further desirably address the circumstance of an output misconnection. If, for example, an LED load 308a is connected between terminals LED+1 and LED-2, the current will still be forced back to the secondary winding T1s of the first channel 302a through the current sensing resistor R1 of the first channel 302a because it defines the only return path of the LED output return current. The current sensing signal will always be correct regardless of the channel (e.g., LED-1, LED-2, LED-x) to which the second end of the load 308a is connected. This circuit topology can accordingly improve the product reliability dramatically.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A multi-channel power supply comprising:
    first and second power converters configured to drive respective first and second lighting sources, each of the first and second power converters respectively comprising
        a first stage configured to provide current through a primary winding of an isolation transformer;
        a second stage having
            an energy storage device coupled in parallel with a secondary winding of the isolation transformer,
            a current sensing resistor coupled on a first end to the secondary winding and on a second end to a circuit ground for the second stage, and
            a filtering circuit coupled on a first end to a node between the secondary winding and the current sensing resistor, and on a second end to the circuit ground; and
        a feedback circuit coupled between the first stage and the filtering circuit, and configured to deliver a control signal to the first stage corresponding to a current through the secondary winding.

2. The power supply of claim 1, wherein the circuit ground for the second stage is coupled to a node between the second end of the current sensing resistor and the energy storage device.

3. The power supply of claim 2, wherein the feedback circuit comprises an amplifier circuit configured to receive a first input from the filtering circuit representative of the current through the secondary winding and a second input from a dimming controller, and wherein the feedback circuit is configured to deliver a control signal to the first stage corresponding to a difference between the first and second inputs.

4. The power supply of claim 3, wherein the amplifier circuit receives the first input as a negative signal, and comprises an operational amplifier further configured to reverse the signal polarity of the first input.

5. The power supply of claim 4, wherein the feedback circuit further comprises an isolation circuit coupled between the amplifier circuit and the first stage.

6. The power supply of claim 5, further comprising the dimming controller, wherein the dimming controller is configured to receive a dimming input signal from an external dimming device and to generate reference signals as the second input to the respective feedback circuits for the first and second power converters.

7. The power supply of claim 6, wherein the filtering circuit comprises a resistor and a capacitor coupled in series, with the first input to the amplifier circuit provided from a node between the resistor and the capacitor of the filtering circuit.

8. The power supply of claim 7, wherein the second stage further comprises a rectifier diode to convert AC power from the secondary winding to DC power for input to an LED array as the light source.

9. The power supply of claim 8, wherein the second stage of the first power converter and the second stage of the second power converter are each coupled to the same circuit ground.

10. A method of operation for a multi-channel LED driver comprising first and second power converters, each of the first and second power converters respectively comprising an energy storage device coupled in parallel with a secondary winding of an isolation transformer, the energy storage device having a first end and a second end with the second end being coupled to a common circuit ground for the first and second power converters, and a current sensing resistor coupled between the secondary winding and the second end of the energy storage device, the method comprising:
coupling a first end of an LED light source to a first terminal corresponding to the first end of the capacitor in the first power converter and a second end of the LED source to a second terminal corresponding to the second end of the capacitor in the second power converter;
filtering out an AC ripple across the respective current sensing resistors for the first and second power converters, wherein an average current through the current sensing resistors corresponds to a DC current through the LED light source; and
controlling each of the first and second power converters to provide a current through the respective secondary windings based on the sensed average current.

11. The method of claim 10, further comprising
providing a first input to a feedback circuit representative of the current through the secondary winding;
providing a second input from a dimming controller to the feedback circuit; and
delivering a control signal from the feedback circuit corresponding to a difference between the first and second inputs.

12. The method of claim 11, wherein the first input is provided as a negative signal, further comprising reversing the signal polarity of the first input.

13. The method of claim 11, further comprising
receiving a dimming input signal from an external dimming device; and
generating reference signals as the second input to the respective feedback circuits for the first and second power converters.

14. A multi-channel LED driver comprising:
first and second power converters configured to drive respective first and second lighting sources,
each of the first and second power converters respectively comprising
an energy storage device coupled in parallel with a secondary winding of an isolation transformer, the energy storage device having a first end and a second end with the second end being coupled to a common circuit ground for the first and second power converters,
a current sensing resistor coupled between the secondary winding and the second end of the energy storage device,
wherein a discharge path is defined between the energy storage device and the circuit ground,
wherein a separate current return path is defined between the secondary winding and the circuit ground through the current sensing resistor, and
a controller configured to provide a current through the respective secondary windings based on a sensed average current through the secondary winding.

15. The LED driver of claim 14, further comprising:
a filtering circuit coupled on a first end to a node between the secondary winding and the current sensing resistor, and on a second end to the circuit ground; and
a feedback circuit coupled between the controller and the filtering circuit, and configured to deliver a control signal to the controller corresponding to a current through the secondary winding.

16. The LED driver of claim 15, wherein the feedback circuit comprises an amplifier circuit configured to receive a first input from the filtering circuit representative of the current through the secondary winding and a second input from a dimming controller, and wherein the feedback circuit is configured to deliver a control signal to the controller corresponding to a difference between the first and second inputs.

17. The LED driver of claim 16, wherein the amplifier circuit receives the first input as a negative signal, and comprises an operational amplifier further configured to reverse the signal polarity of the first input.

18. The LED driver of claim 17, wherein the feedback circuit further comprises an isolation circuit coupled between the amplifier circuit and the controller.

19. The LED driver of claim 18, further comprising the dimming controller, wherein the dimming controller is configured to receive a dimming input signal from an external dimming device and to generate reference signals as the second input to the respective feedback circuits for the first and second power converters.

20. The LED driver of claim 19, wherein the filtering circuit comprises a resistor and a capacitor coupled in series, with the first input to the amplifier circuit provided from a node between the resistor and the capacitor of the filtering circuit.

* * * * *